US006965925B1

(12) United States Patent
Shank et al.

(10) Patent No.: US 6,965,925 B1
(45) Date of Patent: Nov. 15, 2005

(54) DISTRIBUTED OPEN ARCHITECTURE FOR MEDIA AND TELEPHONY SERVICES

(75) Inventors: Charles Kevin Shank, Austin, TX (US); R. Alberto Villarica, Fairport, NY (US)

(73) Assignee: Nortel Networks, Ltd, St. Laurent (CA)

( * ) Notice: Subject to any disclaimer, the term of this patent is extended or adjusted under 35 U.S.C. 154(b) by 0 days.

(21) Appl. No.: 09/223,972

(22) Filed: Dec. 31, 1998

(51) Int. Cl.[7] .............................................. G06F 13/00
(52) U.S. Cl. ....................... 709/219; 719/315; 719/328
(58) Field of Search ................................ 709/203, 217, 709/219, 206, 223, 225, 226, 313, 315, 328, 709/329, 719; 719/313, 315, 328

(56) References Cited

U.S. PATENT DOCUMENTS

| | | | | |
|---|---|---|---|---|
| 5,726,979 A | * | 3/1998 | Henderson et al | 370/254 |
| 5,978,940 A | * | 11/1999 | Newman et al. | 714/712 |
| H1837 H | * | 2/2000 | Fletcher et al. | 455/433 |
| 6,026,087 A | * | 2/2000 | Mirashrafi et al. | 370/389 |
| 6,041,325 A | * | 3/2000 | Shah et al | 707/10 |
| 6,058,166 A | * | 5/2000 | Osder et al. | 379/88.22 |
| 6,101,473 A | * | 8/2000 | Scott et al. | 704/275 |
| 6,128,304 A | * | 10/2000 | Gardell et al. | 370/401 |
| 6,134,600 A | * | 10/2000 | Liu | 709/316 |
| 6,163,535 A | * | 12/2000 | Jordan et al. | 370/352 |
| 6,167,253 A | * | 12/2000 | Farris et al. | 455/412 |
| 6,173,279 B1 | * | 1/2001 | Levin et al. | 707/5 |
| 6,215,858 B1 | * | 4/2001 | Bartholomew et al. | 379/88.17 |
| 6,216,104 B1 | * | 4/2001 | Moshfeghi et al. | 704/260 |
| 6,298,352 B1 | * | 10/2001 | Kannan et al. | 707/102 |
| 6,301,245 B1 | * | 10/2001 | Luzeski et al. | 370/352 |
| 6,314,172 B1 | * | 11/2001 | Nightingale | 379/201 |
| 6,335,964 B1 | * | 1/2002 | Bowater et al. | 379/88.16 |
| 6,434,150 B1 | * | 8/2002 | Bog et al | 370/395.1 |
| 6,496,865 B1 | * | 12/2002 | Sumsion et al. | 709/229 |

* cited by examiner

*Primary Examiner*—Viet D. Vu
(74) *Attorney, Agent, or Firm*—John C. Gorecki, Esq.

(57) ABSTRACT

A server provides media and telephony services in a telecommunications network. The server has a distributed, object-oriented software architecture, allowing client applications to access resources located anywhere in the network. The server provides interfaces to media and telephony resources so that client applications, which may access the server through an IP data network, can access the resources. The software architecture framework is provided by Common Object Request Broker Architecture (CORBA).

15 Claims, 3 Drawing Sheets

DISTRIBUTED OPEN ARCHITECTURE FOR MEDIA AND TELEPHONY SERVICES

CROSS-REFERENCE TO RELATED APPLICATIONS

This application is related to U.S. Pat. No. 6,445,776 entitled "Abstract Interface for Media and Telephony Services," which was filed Dec. 31, 1998.

BACKGROUND OF THE INVENTION

The present invention relates generally to a system and method for providing media and telephony services in a telecommunications network and, more particularly, to an object-oriented system for providing media and telephony services in a distributed computing environment.

The demand for advanced telephony applications in telecommunications networks has grown significantly during the past few years. The area of media and telephony applications, also referred to as computer telephony, includes a wide variety of application-specific devices, many of which have proprietary implementations. A diverse group of vendors develops, sells, and supports devices such as interactive voice response (IVR) systems, voice mail systems, e-mail gateways, fax servers, and automatic call distributors (ACDs). Many of these applications use emerging technologies such as voice compression and expansion, text-to-speech translation, automatic speech recognition, and facsimile-to-text translation.

As telephony applications have become more numerous and complex, interoperability problems have arisen. Further, it is difficult to develop integrated applications that combine features of different application-specific devices because they are developed by different vendors and often use proprietary software. Thus, a need arose for a framework for developing telephony applications in which vendors agree on certain aspects of implementation to allow interoperability of products and software. In response to this need, the Enterprise Computer Telephony Forum (ECTF) has defined such a framework. The ECTF framework provides the ability for computer telephony applications to share media resources (e.g., voice recognition). The ECTF has specified several application program interfaces (APIs), including S. 100, which defines an interface between a media server and computer telephony applications.

Media servers compliant with the ECTF S. 100 API provide a means for developing computer telephony applications in an open client-server environment with shared resources. The S. 100 API is a hardware-independent and operating system-independent API. However, the S. 100 API, based on the C programming language, is a language dependent interface, which makes S. 100 ultimately dependent on the platform used. Also, current system architectures for providing telephony services do not take full advantage of object-oriented programming methods or use distributed processing, thus making it more difficult to extend architectures to include new components. Furthermore, current system architectures with distributed components utilize proprietary protocols.

SUMMARY OF THE INVENTION

A server consistent with the present invention comprises an interface to a data network, an interface to a resource providing a service, and means for receiving from a client application, coupled to the data network, an object-oriented, language independent request for access to the resource. Consistent with the present invention, the request includes a parameter needed by the resource, and the interface to the resource includes means for passing the parameter to the resource.

A method consistent with the present invention provides remote services by a server, coupled to a resource, by receiving from a client application an object-oriented, language-independent request for access to the resource, decoding the request to determine a parameter needed by the resource, and passing the parameter to the resource.

Additional features and advantages of the present invention will be readily appreciated by one of ordinary skill in the art from the following detailed description of the best mode for carrying out the invention when taken in connection with the accompanying drawings.

DETAILED DESCRIPTION OF THE PREFERRED EMBODIMENTS

An architecture consistent with the present invention allows development of applications and services in a modular manner and provides for growth from a single node system to a multiple node system, in which services and applications can be located on various nodes throughout the system. Although the context of this description is that of media servers providing a development environment for telephony applications, it should be appreciated that the invention has a broader potential application, and may be used for development of other applications, such as applications on the World Wide Web.

Figure 1:
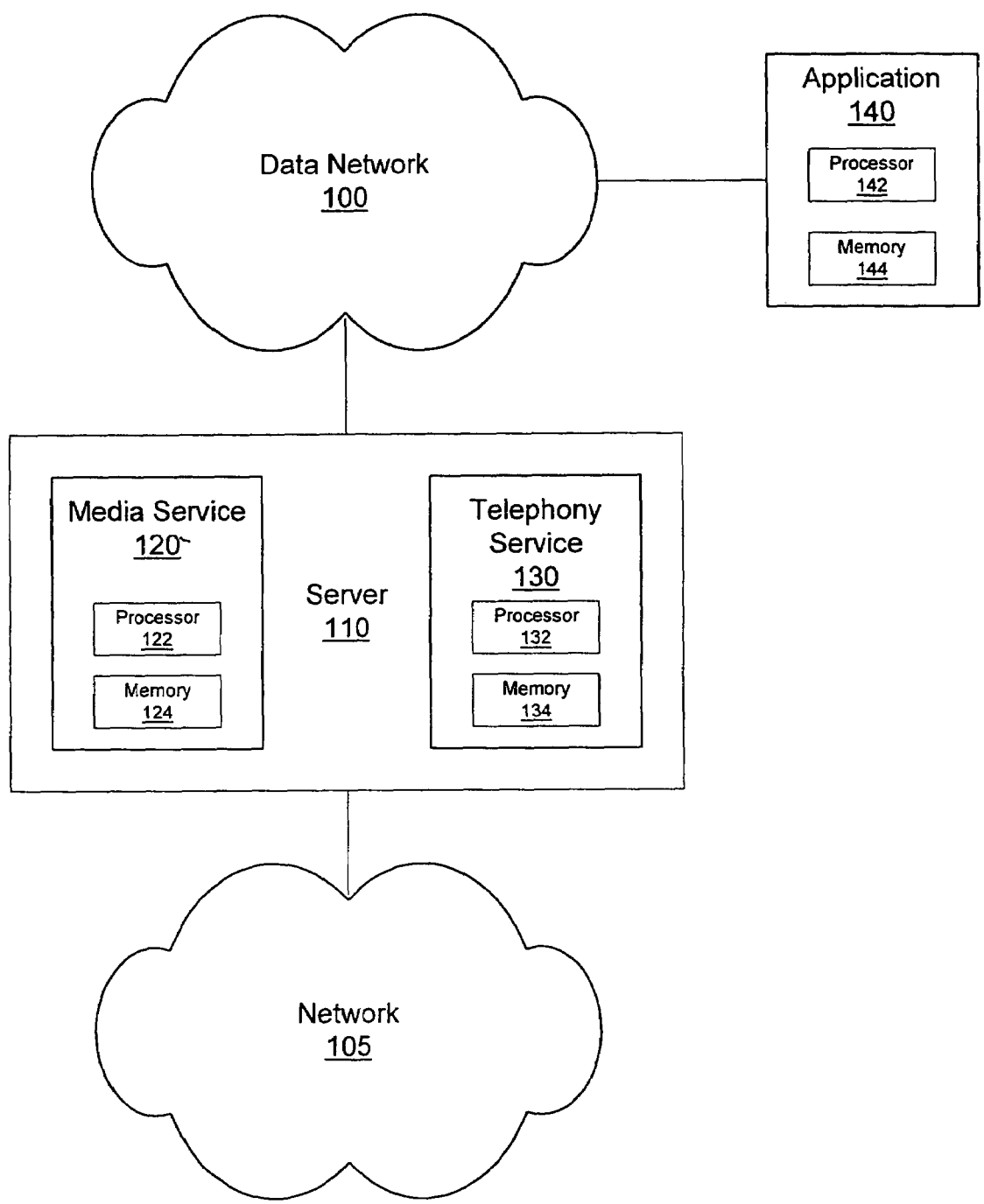
FIG. 1 is a high-level block diagram of a system architecture consistent with the present invention.

FIG. 1 illustrates a high-level block diagram of a system architecture consistent with the present invention. Network 100 may be any type of data network, including an Internet Protocol (IP) network. Server 110, which is a logical grouping of media service 120 and telephony service 130, is coupled to network 100. Consistent with the present invention, media service 120 and telephony service 130 provide interfaces to media and telephony objects that may be located anywhere in network 100. Media service 120 and telephony service 130 may be collocated on the same node or on separate nodes. Media services include services for media interactions, such as text-to-speech translation, interactive voice response, and speech recognition and verification. Telephony services include call control services (e.g., making calls, taking calls, transferring calls, and joining calls) and transaction handling services (e.g., making SS7 Transaction Capabilities Application Part (TCAP) queries).

Media service 120 and telephony service 130 are also coupled to network 105, which may be any type of telecommunications network, including a Public Switched Telephone Network (PSTN) or a private network. Media service 120 and telephony service 130 are coupled to network 105 using adapters (not shown) specific to network 105. For example, media service 120 can be connected to network 105 via a Dialogic T1 card.

Application 140, coupled to network 100, uses the interface provided by media service 120 and telephony service 130. Application 140 invokes methods on media service 120 and/or telephony service 130. Application 140 does not have to be collocated with media service 120 or telephony service 130, although the present invention does not preclude the collocation of application 140 with either media service 120 or telephony service 130.

Media service 120, telephony service 130, and application 140 include processors 122, 132, and 142, respectively, and memories 124, 134, and 144, respectively. Processors 122, 132, and 142 may be provided by conventional microprocessor circuits. Memories 124, 134, and 144 may include both RAM and ROM portions and may be implemented with any type of computer-readable medium, such as any electronic, magnetic, or optical read/write storage device. Memories 124, 134, and 144 store data that serves as instructions to processors 122, 132, and 142, respectively, and which, when executed by processors 122, 132, and 142, cause media service 120, telephony service 130, and application 140 to carry out methods that are described below.

SYSTEM ARCHITECTURE

Figure 2:
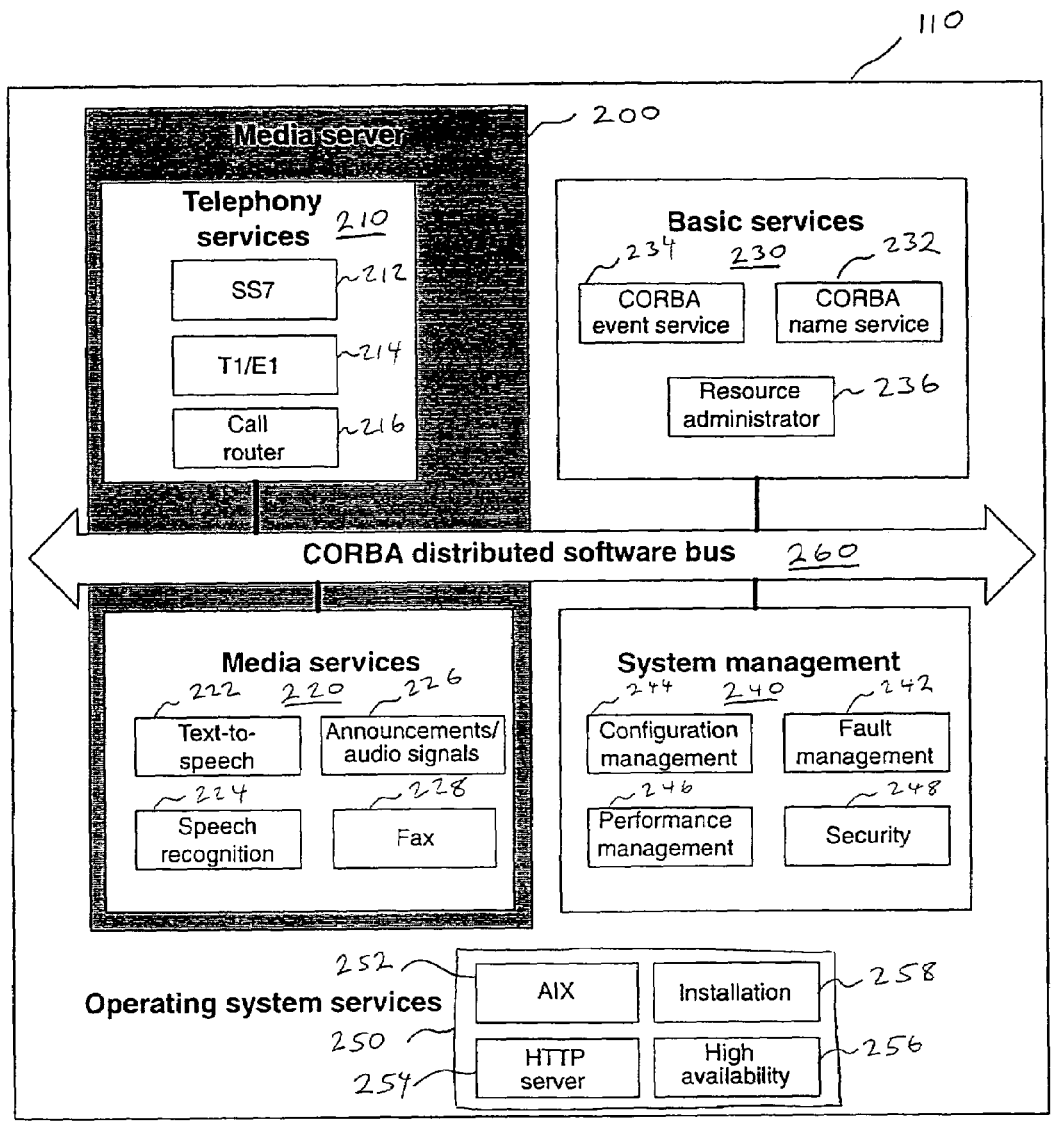
FIG. 2 illustrates a high-level software architecture of a server consistent with the present invention.

FIG. 2 illustrates a high-level software architecture of server 110 consistent with the present invention. Server 110 includes the following resources: media server 200, comprising telephony services interface 210 and media services interface 220; basic services portion 230; and system management portion 240. Server 110 also includes operating system services portion 250 and distributed software bus 260. A software architecture consistent with the present invention uses an object-oriented communication framework that provides location-transparent communication among the architectural components. The framework may be provided, for example, by Common Object Request Broker Architecture (CORBA), an industry standard architecture developed by the Object Management Group (OMG) for systems integration. Details of CORBA can be found at www.omg.org which is hereby incorporated by reference.

In general, CORBA brings together object-oriented computing and distributed computing. A CORBA-based system is composed of cooperating objects on a software bus, which is called the object request broker (ORB). Each object has an interface, which in CORBA is an abstract, language-independent representation of the set of methods that can be understood by the object. Objects do not have to be collocated. Method invocations on remote objects occur through an underlying protocol, which can be specific to an ORB vendor or based on an industry standard. Referring to FIG. 2, distributed software bus 260 is an ORB, through which client applications interface with telephony services interface 210, media services interface 220, basic services portion 230, and system management portion 240. The ORB enables objects to make requests and receive responses transparently in a distributed environment.

CORBA 2.0 specifies an interoperability protocol, Internet Inter-ORB Protocol (IIOP), that allows objects implemented using one vendor's ORB to communicate with an object using another vendor's ORB. An application developer is shielded from all details of the lower-level interaction, including the locations of the objects and the marshaling (i.e., encoding to convert interfaces and parameters into flattened message formats to transfer over a network) and unmarshaling (i.e., decoding) of arguments.

Interface Definition Language (IDL) is essential to interoperability of components in a CORBA system. IDL is a neutral intermediate language that specifies a component's boundaries, interfaces with potential clients, or any description of a resource or service that the server component wants to expose to a client. IDL is not a programming language; it is instead a language for expressing interfaces.

Several commercial implementations of the CORBA standard exist. Orbix, developed by Iona Technologies, is one such implementation that may be used in methods and systems consistent with the present invention. Orbix consists of a CORBA 2.0-compliant object request broker (ORB), an IDL compiler, and related tools. The ORB mediates between clients and implementations of application objects and must provide a standard interface to such clients, and another to such implementations of application objects. The CORBA standard does not specify whether the ORB is a set of runtime libraries, a set of daemon processes, a server machine, or part of an operating system.

Orbix is implemented as a pair of libraries—one for client applications and one for servers—and the orbixd daemon. The orbixd daemon need only be present at nodes running CORBA servers, and it is responsible for launching server processes dynamically. Because of the library implementation of Orbix ORB, there is no central component through which all object requests must pass. Instead, object requests pass directly from the client (application) code to the invoked server object implementation. If the server and client are in different processes, the method invocation is marshalled in the client process, transmitted over an IP network, unmarshalled in the server process, and dispatched to the appropriate server object by the object adapter. The role of orbixd is to connect clients and servers for the first time. Since Orbix adheres to IIOP, the Orbix ORB can interoperate with any other ORB that also supports the standard IIOP.

Another important component of Orbix is its compiler technology, which translates CORBA IDL into programming language code, e.g., C++, that performs remote calls. The generated code is sufficiently sophisticated so that developers are not burdened with extra programming steps after translation.

Referring again to FIG. 2, operating system services portion 250 provides an underlying architecture that supports server 110. Consistent with the present invention, operating system 252 may be a UNIX operating system such as AIX 4.1.5, which is built on open standards including UNIX95, XPG4, and X/Open. Server 110 also includes standards-compliant HTTP server 254, which, in conjunction with graphical clients, provides a window into the system. High availability services 256 provide active and standby 10BaseT or 100BaseT Ethernet network interface cards (NICs). For applications that do not tolerate a single point of failure, network traffic is automatically switched to the standby NIC when failure of a NIC or external hub is detected. Installation services 258 provide the ability to install server 110 as a stand-alone unit or in a line-up.

FIG. 2 also shows basic services portion 230, which provides basic services available to applications and resources. CORBA name service 232 allows a resource developer to place resources at specified locations and allows other resources to find and access those resources by name. CORBA name service 232 may be implemented, for example, by OrbixNames, part of the Orbix product family. CORBA event service 234 allows objects to communicate in an event-driven style. The event service, which may be implemented using OrbixTalk, allows applications to determine which events are relevant to them and perform actions as required. The event service allows for decoupled design between generating and receiving events, which simplifies the implementation of object-oriented design and enhances scalability.

Consistent with the present invention, basic services portion 230 also includes resource administrator 236, which provides network-wide tracking of resources, which can be shared among applications. When a resource becomes available, it registers with resource administrator 236 by providing information including type and, optionally, any attributes or properties that distinguish it from other resources. Resources can query resource administrator 236 for the existence of resources by interface type and an optional list of properties. If several resources match a particular type, resource administrator 236 balances resource utilization by using a least-recently-used algorithm to determine which resource to use, and favors local resources over remote resources.

Resource administrator 236 tracks resource owners for resource recovery. This reduces the amount of maintenance required to attain a high level of system availability. Resource administrator 236 also provides a first line of security by allowing resources to access other resources only if authorized to do so.

Resource administrator 236 may be a multi-tiered service, including both local resource administrators and network-wide administrators. In this case, a local resource administrator tracks local, or nodal, resources, and queries a network-wide administrator if it cannot satisfy a request.

Media services interface 220 provides interfaces to media services including, for example, text-to-speech services (interface 222), speech recognition services (interface 224), announcements/audio signals services (interface 226), and facsimile services (interface 228). Telephony services interface 210 allows server 110 to interact with telecommunications network 105 and provides interfaces to telephony services including, for example, system call router interface 216 and interfaces to the SS7 signaling network (interface 212) and T1/E1 signaling (interface 214).

Figure 3:
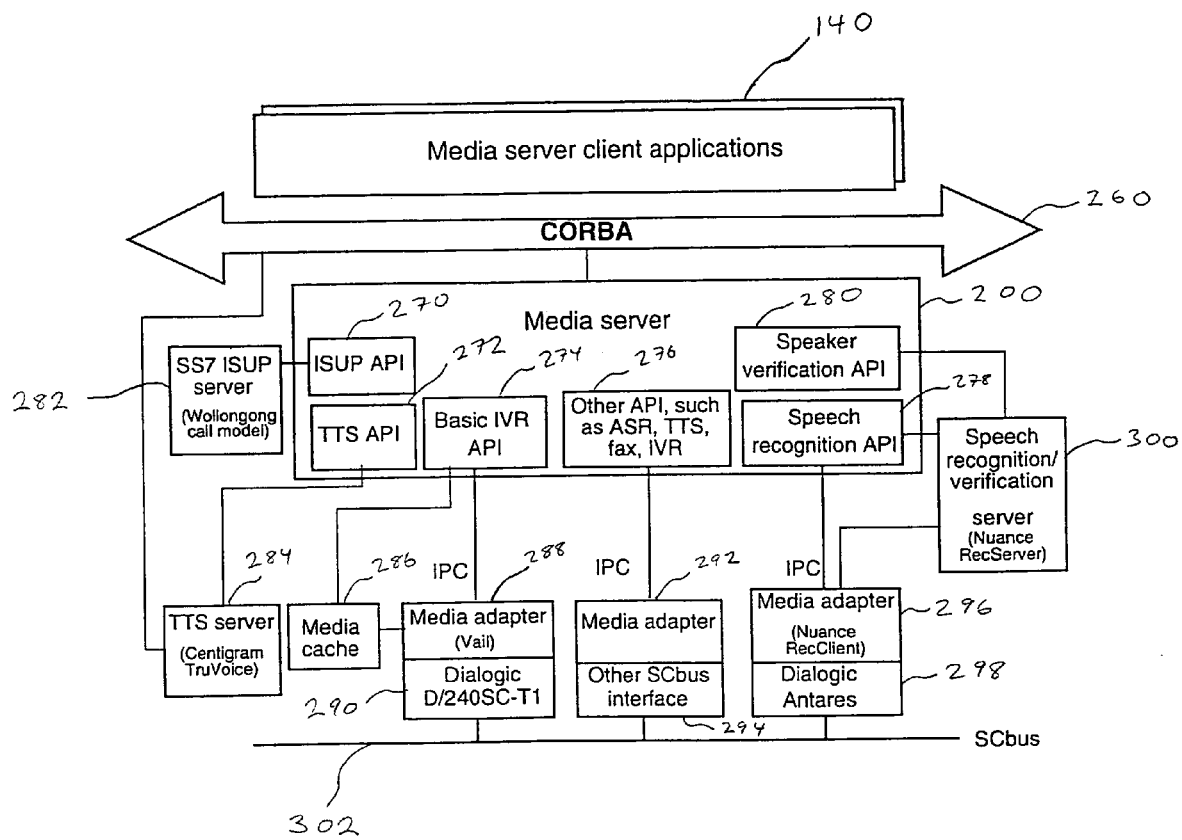
FIG. 3 illustrates a detailed internal structure of a media server consistent with the present invention and its interactions with applications and resources.

FIG. 3 illustrates a detailed internal structure of media server 200 and its interactions with client application 140 and resources consistent with the present invention. In order to provide an interface to media services (interface 220) and to telephony services (interface 210) as shown in FIG. 2, media server 200 accesses hardware components that provide the functionality for such services. FIG. 3 shows several components that may be accessed by media server 200. For example, one telephony service that media server 200 may access is server 282, which provides SS7 ISDN User's Part (ISUP) signaling. SS7 ISUP application programming interface (API) 270 translates messages from media server 200 into SS7 ISUP messages and communicates the SS7 ISUP messages to SS7 ISUP server 282.

FIG. 3 also shows several components that provide media services and may be accessed by media server 200. For example, TTS server 284 provides text-to-speech translation and may be a commercially available TTS server such as Centigram's TruVoice® 5.1 or Eloquence Technologies Inc.'s Eloquent 2.0. Media server 200 accesses TTS server 284 through TTS API 272, which transports method requests and responses and asynchronous events between media server 200 and TTS server 284. FIG. 3 also shows speech recognition/verification server 300, which may be a commercially available speech recognition and verification server such as Nuance's RecServer™. Media server 200 accesses speech recognition/verification server 300 through speaker recognition API 278 and/or speaker verification API 280.

Speech recognition services may also be provided in hardware/firmware by speech recognition component 298, e.g., the Antares™ automatic speech recognition (ASR) platform, commercially available from Dialogic®. Speech recognition component 298 may be coupled to media adapter 296, e.g., Nuance's RecClient™, which provides a higher-level interface to speech recognition component 298. Media server 200 accesses speech recognition component 298 through speech recognition API 278, which accesses media adapter 296 via an interprocess communication capability.

Media server 200 may provide IVR service by accessing IVR component 290, which may be a commercially available product such as Dialogic® D/240SC-T1. Media server 200 accesses IVR component 290 through basic IVR API 274. IVR component 290 may be coupled to media adapter 288, which presents a higher-level interface to basic IVR API 274 and may be a commercially available product or a proprietary API, e.g., a media adapter provided by Nortel Server's Vail API. Media cache 286 provides cache storage for IVR applications.

Hardware components coupled to media server 200 may communicate with each other via time division multiplexed (TDM) bus 302, which may be an SCbuS™ compliant with the Signal Computing System Architecture™ (SCSA) hardware model, an industry standard TDM architecture.

It should be apparent to one skilled in the art that the specific hardware components providing media or telephony services in FIG. 3 are exemplary only. Media server 200 may access any resource that provides functionality for a media or telephony service. Also, as shown in FIG. 3, media server 200 may include API 276 for any application such as ASR, TTS, IVR, or facsimile, that accesses media adapter 292, which accesses other hardware components connected to bus 302 via interface 294.

Referring again to FIG. 2, server 110 includes system management portion 240, which includes at least the following categories of system management based on the Open Systems Interconnection (OSI) system management definition: fault management portion 242, configuration management portion 244, performance management portion 246, and security portion 248. System management portion 240 provides the APIs and user interfaces (UIs) for applications, resources, network components, and hardware components utilizing server 110 to be managed in a consistent and extensible manner.

Fault management portion 242 provides a mechanism for generating, collecting, monitoring, and displaying fault events, such as logs and alarms. A fault event can be generated, for example, by an IDL API that is part of telephony services interface 210 or media services interface 220. Configuration management portion 244 provides mechanisms for system installation; software distribution, which provides the ability to define, administer, and distribute software and configuration data; resource state management, which allows applications and components with the environment of server 110 to be managed from an operations workstation and may be based on the ISO X.732 resource state model; and configuration (datafill) management, which allows applications to define, generate, and distribute configuration information and notify applications of configuration change events. Performance management portion 246 allows application to define, generate, collect, store, and display performance measurement information based on performance data generated by applications using an IDL API and collected into a database. Security portion 248 provides an interface to manage security information such as user accounts and passwords.

It will be appreciated by those skilled in this art that various modifications and variations can be made to the object-oriented system for providing media and telephony services in a distributed computing environment described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A server comprising:
    an interface to a data network;
    an interface to a computer telephony resource providing a computer telephony service; and
    means for receiving a first request from a client application coupled to the data network, said first request containing an object-oriented, language independent, second request to the computer telephony resource for provision of the computer telephony service by the computer telephony resource to the client application.

2. The server of claim 1 further comprising
    a resource administrator for tracking availability of the resource.

3. The server of claim 1 wherein the request includes a parameter needed by the resource, and wherein the interface to the resource includes means for passing the parameter to the resource.

4. The server of claim 1 wherein the resource is a text-to-speech server, and wherein the means for receiving an object-oriented, language independent request from the client application includes means for receiving a request for access to the text-to-speech server.

5. The server of claim 1 wherein the resource is a speech recognition device, and wherein the means for receiving an object-oriented, language independent request from the client application includes means for receiving a request for access to the speech recognition device.

6. The server of claim 1 wherein the resource is a speaker verification device, and wherein the means for receiving an object-oriented, language independent request firm the client application includes means for receiving a request for access to the speaker verification device.

7. The server of claim 1 wherein the resource is an interactive voice response device, and wherein the means for receiving an object-oriented, language independent request from the client application includes means for receiving a request for access to the interactive voice response device.

8. The server of claim 1 wherein the resource is a facsimile device, and wherein the means for receiving an object-oriented, language independent request from the client application includes means for receiving a request for access to the facsimile device.

9. The server of claim 1 further comprising
    an interface to a telecommunications network,
    and wherein the resource provides a telephony service in the telecommunications network.

10. The server of claim 9 wherein the resource is a call router, and wherein the means for receiving an object-oriented, language independent request from the client application includes means for receiving a request for access to the call router.

11. The server of claim 9 wherein the resource is a signaling system server, and wherein the means for receiving an object-oriented, language independent request from the client application includes means for receiving a request for access to the signaling system server.

12. A method for providing remote services by a server coupled to a computer telephony resource, the method comprising the steps of:
    receiving a first request from a client application, said first request containing an object-oriented, language-independent second request to the computer telephony resource for provision of services by the computer telephony resource to the client application;
    decoding the second request to determine a parameter needed by the computer telephony resource; and
    passing the parameter to the computer telephony resource.

13. A system for providing at least one of media services and telephony services in a telecommunications network, comprising:
    a server having a services interface, said server being configured to provide the at least one of media services and telephony services to a client application; and
    a distributed software bus configured to interface the client application to the server over a network;
    wherein the distributed software bus is configured to be used by the client application to obtain the at least one of media services and telephony services by issuing a first request on the network, said first request containing an object-oriented, language independent, second request for the provision of the at least one of media services and telephony services by at least one of a computer telephony resource and a media resource to the client application.

14. The system for providing telephony services in a telecommunications network of claim 13, wherein said distributed software bus comprises an object request broker interfacing objects on the bus.

15. The system for providing telephony services in a telecommunications network of claim 13, wherein the system is an object-oriented system for providing media and telephony services in a distributed computing environment.

* * * * *